United States Patent
Cheng et al.

(10) Patent No.: US 12,452,780 B2
(45) Date of Patent: Oct. 21, 2025

(54) FAST SLICING SWITCHING VIA SCG SUSPENSION OR ACTIVATION

(71) Applicant: QUALCOMM Incorporated, San Diego, CA (US)

(72) Inventors: Peng Cheng, Beijing (CN); Ravi Agarwal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 460 days.

(21) Appl. No.: 18/017,843

(22) PCT Filed: Sep. 18, 2020

(86) PCT No.: PCT/CN2020/116049
§ 371 (c)(1),
(2) Date: Jan. 24, 2023

(87) PCT Pub. No.: WO2022/056799
PCT Pub. Date: Mar. 24, 2022

(65) Prior Publication Data
US 2023/0276353 A1    Aug. 31, 2023

(51) Int. Cl.
*H04W 48/18* (2009.01)
*H04W 36/00* (2009.01)
(Continued)

(52) U.S. Cl.
CPC ........ *H04W 48/18* (2013.01); *H04W 36/0011* (2013.01); *H04W 60/04* (2013.01); *H04W 76/15* (2018.02); *H04W 36/00692* (2023.05)

(58) Field of Classification Search
CPC . H04W 48/18; H04W 36/0011; H04W 60/04; H04W 76/15; H04W 36/00692; H04W 76/38; H04W 36/0061
See application file for complete search history.

(56) References Cited

U.S. PATENT DOCUMENTS

| | | |
|---|---|---|
| 2018/0324663 A1 | 11/2018 | Park et al. |
| 2020/0068430 A1 | 2/2020 | Chan et al. |
| 2021/0136715 A1* | 5/2021 | Jeong .................... H04W 48/18 |

FOREIGN PATENT DOCUMENTS

| | | |
|---|---|---|
| CN | 110024466 A | 7/2019 |
| CN | 110546975 A | 12/2019 |

(Continued)

OTHER PUBLICATIONS

Ericsson: "Update of Solution #1.5: Mutually Exclusive Access to Network Slices using Existing Mechanisms", 3GPP TSG-SA WG2 Meeting #129, S2-1811061, Dongguan, P.R. China, 20181015-20181019, pp. 1-6, Oct. 19, 2018 (Oct. 19, 2018), the whole document.

(Continued)

*Primary Examiner* — Shawn D Miller
(74) *Attorney, Agent, or Firm* — Procopio, Cory, Hargreaves & Savitch LLP

(57) ABSTRACT

Methods, computer program products, and apparatuses for network slices based on master cell group (MCG) or secondary cell group (SCG) configurations are provided. An example method may include transmitting, to a base station, a registration request comprising first single network slice selection assistance information (S-NSSAI) associated with a first network slice and second S-NSSAI associated with a second network slice. The method may include receiving, from the base station, a registration accept message associated with the first network slice and the second network slice. The first network slice may be associated with a first priority higher than a second priority associated with the second network slice. The first network slice may be served by an MCG and the second network slice may be served by an SCG. The method may include initiating a first inactivity (Continued)

timer for the MCG and a second inactivity timer for the SCG.

30 Claims, 11 Drawing Sheets

(51) Int. Cl.
*H04W 60/04* (2009.01)
*H04W 76/15* (2018.01)

(56) References Cited

FOREIGN PATENT DOCUMENTS

| EP | 3448114 A1 | 2/2019 |
|---|---|---|
| WO | 2019191262 A1 | 10/2019 |
| WO | 2020176891 A1 | 9/2020 |

OTHER PUBLICATIONS

International Search Report and Written Opinion—PCT/CN2020/116049—ISA/EPO—Jun. 17, 2021.
Qualcomm Incorporated: "TS 23.501: Handling of PDU Sessions at Slice Unavailability", SA WG2 Meeting #121, S2-174050, Hangzhou, P.R. China, 20170515-201705, pp. 1-9, May 19, 2017 (May 19, 2017), Session 2.
Apple: "KI #6, New Sol: Ue Handling of Constraints on Simultaneous Use of Network Slices Based on Network Assistance", SA WG2 Meeting #140E, S2-2006522, 3rd Generation Partnership Project (3GPP), Mobile Competence Centre, 650, Route Des Lucioles, F-06921 Sophia-Antipolis Cedex, France, vol. SA WG2, No. Elbonia, 20200819-20200902, Sep. 2, 2020, 8 Pages, XP052463789, paragraph [6.X.2]-paragraph [6.X.3].
Ericsson., et al., "Introduction of DL RRC Segmentation", 3GPP TSG-RAN2 Meeting #109-e, RP-200358 (R2-2002159), 3rd Generation Partnership Project (3GPP), Mobile Competence Centre, 650, Route Des Lucioles, F-06921 Sophia-Antipolis Cedex, France, vol. RAN WG2, No. Online, 20200224, Mar. 12, 2020, pp. 1-944 XP052334510, paragraph [5.3.1.3], paragraph [5.3.5.4], paragraph [5.3.5.8], paragraph [5.4.2]-paragraph [5.4.4], paragraph [6.3.4].
Ericsson: "Key Issue #6 New Solution: Network Controlled Enforcement of Simultaneous Usage of Network Slices Based on User Preference", SA WG2 Meeting #139e, S2-2004581, 3rd Generation Partnership Project (3GPP), Mobile Competence Centre, 650, Route Des Lucioles, F-06921 Sophia-Antipolis Cedex, France, vol. SA WG2, No. 20200601-20200612, Jun. 8, 2020, pp. 1-6, XP052461251, paragraph [6.X.1].
Intel Corporation: "Slicing Based Cell (re)Selection", 3GPP TSG RAN WG2 Meeting #111e, R2-2006951, 3rd Generation Partnership Project (3GPP), Mobile Competence Centre, 650, Route Des Lucioles, F-06921 Sophia-Antipolis Cedex, France, vol. RAN WG2, No. E-Meeting, 20200817-20200828, Aug. 7, 2020, 9 Pages, XP052360071, paragraph [02.2], paragraph [0005].
Supplementary European Search Report—EP20953657—Search Authority—Munich—May 21, 2024.

\* cited by examiner

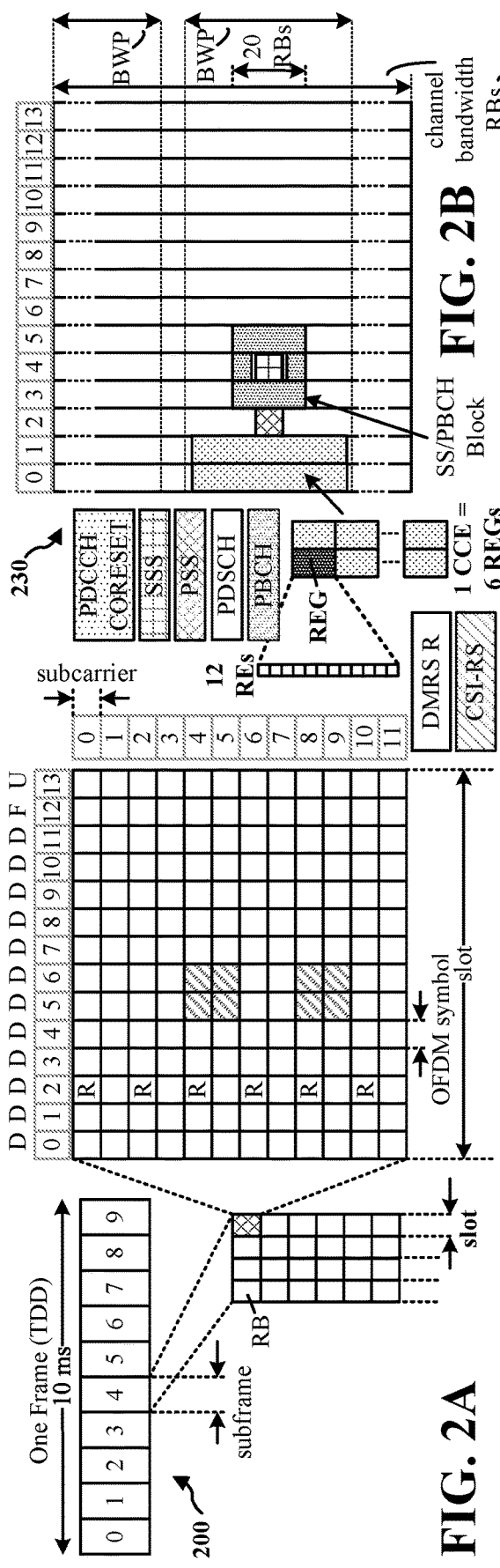
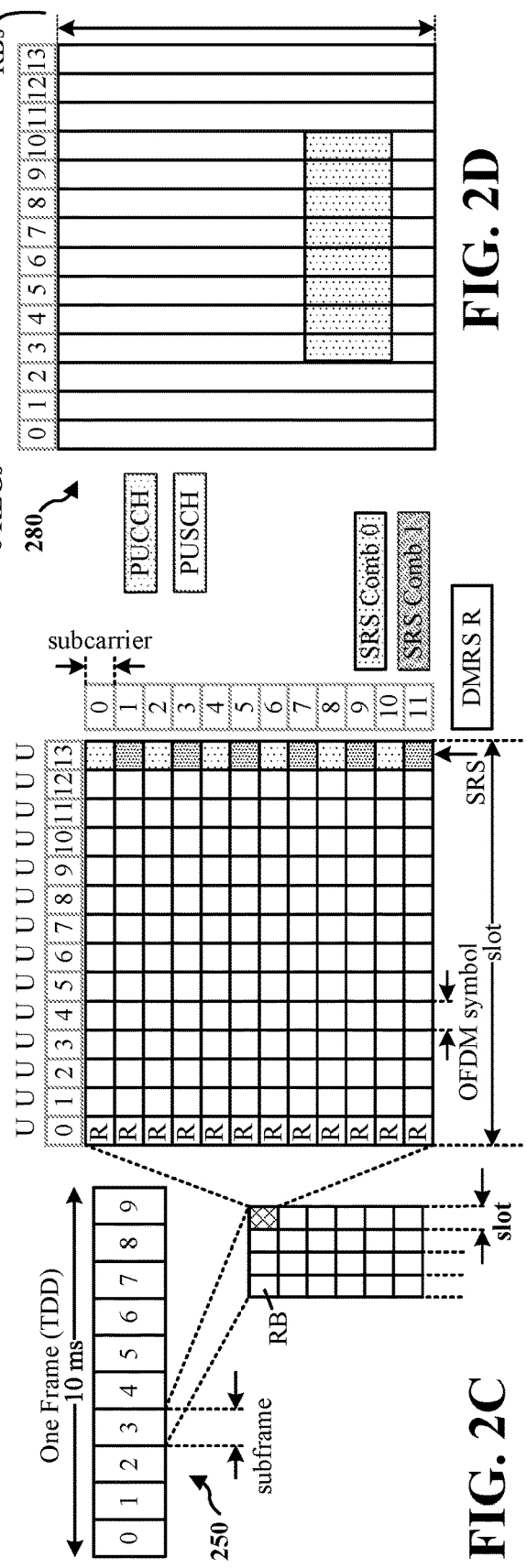
FIG. 2A
FIG. 2B
FIG. 2C
FIG. 2D

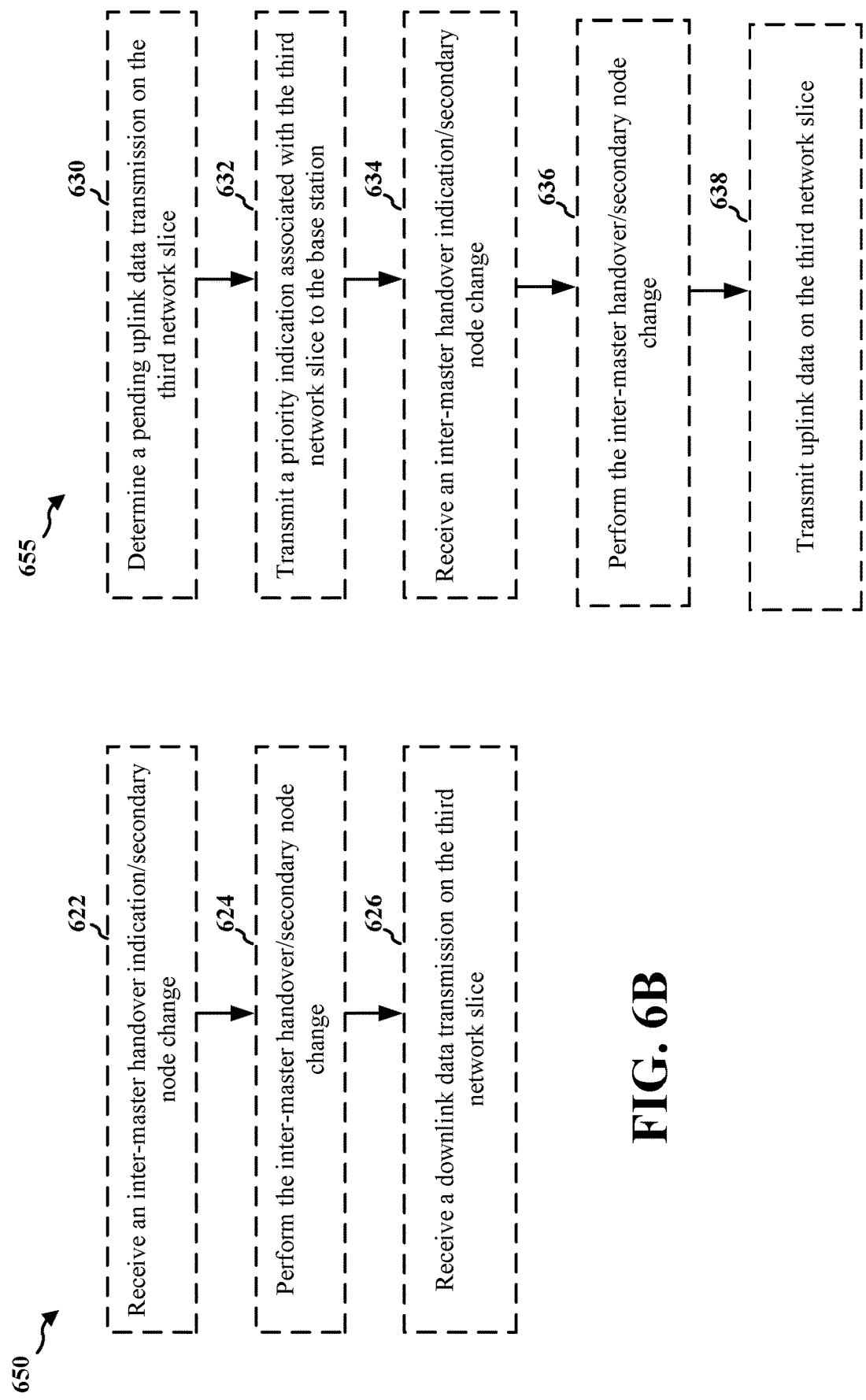

FAST SLICING SWITCHING VIA SCG SUSPENSION OR ACTIVATION

CROSS REFERENCE TO RELATED APPLICATION(S)

This application is a National Stage Application filed under 35 U.S.C. § 371 of PCT International Application Serial No. PCT/CN2020/116049 entitled "FAST SLICING SWITCHING VIA SCG SUSPENSION OR ACTIVATION" and filed on Sep. 18, 2020, which is expressly incorporated by reference herein in its entirety.

BACKGROUND

Technical Field

The present disclosure relates generally to communication systems, and more particularly, to wireless communication systems with network slices.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Methods, computer programs products, and apparatuses for network slices based master cell group (MCG) or secondary cell group (SCG) configurations are provided. In one aspect of the disclosure, a method, a computer-readable medium, and an apparatus are provided for wireless communication of a user equipment (UE). A UE may transmit, to a base station, a registration request comprising first single network slice selection assistance information (S-NSSAI) associated with a first network slice and second S-NSSAI associated with a second network slice. The UE may receive, from the base station, a registration accept message associated with the first network slice and the second network slice. The first network slice may be associated with a first priority higher than a second priority associated with the second network slice. The first network slice may be served by an MCG and the second network slice may be served by an SCG. The UE may initiate a first inactivity timer for the MCG and a second inactivity timer for the SCG.

In another aspect of the disclosure, a method, a computer-readable medium, and an apparatus are provided for wireless communication of a base station. A base station may receive, from a UE, a registration request comprising first S-NSSAI associated with a first network slice and second S-NSSAI associated with a second network slice. The base station may transmit, to the UE, a registration accept message associated with the first network slice and the second network slice. The first network slice may be associated with a first priority higher than a second priority associated with the second network slice. The first network slice may be served by an MCG and the second network slice may be served by an SCG. The base station may initiate a first inactivity timer for the MCG and a second inactivity timer for the SCG.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first frame, in accordance with various aspects of the present disclosure.

FIG. 2B is a diagram illustrating an example of DL channels within a subframe, in accordance with various aspects of the present disclosure.

FIG. 2C is a diagram illustrating an example of a second frame, in accordance with various aspects of the present disclosure.

FIG. 2D is a diagram illustrating an example of UL channels within a subframe, in accordance with various aspects of the present disclosure.

FIGS. 6A-6C are flowcharts of a method of wireless communication at a UE.

DETAILED DESCRIPTION

Figure 1:
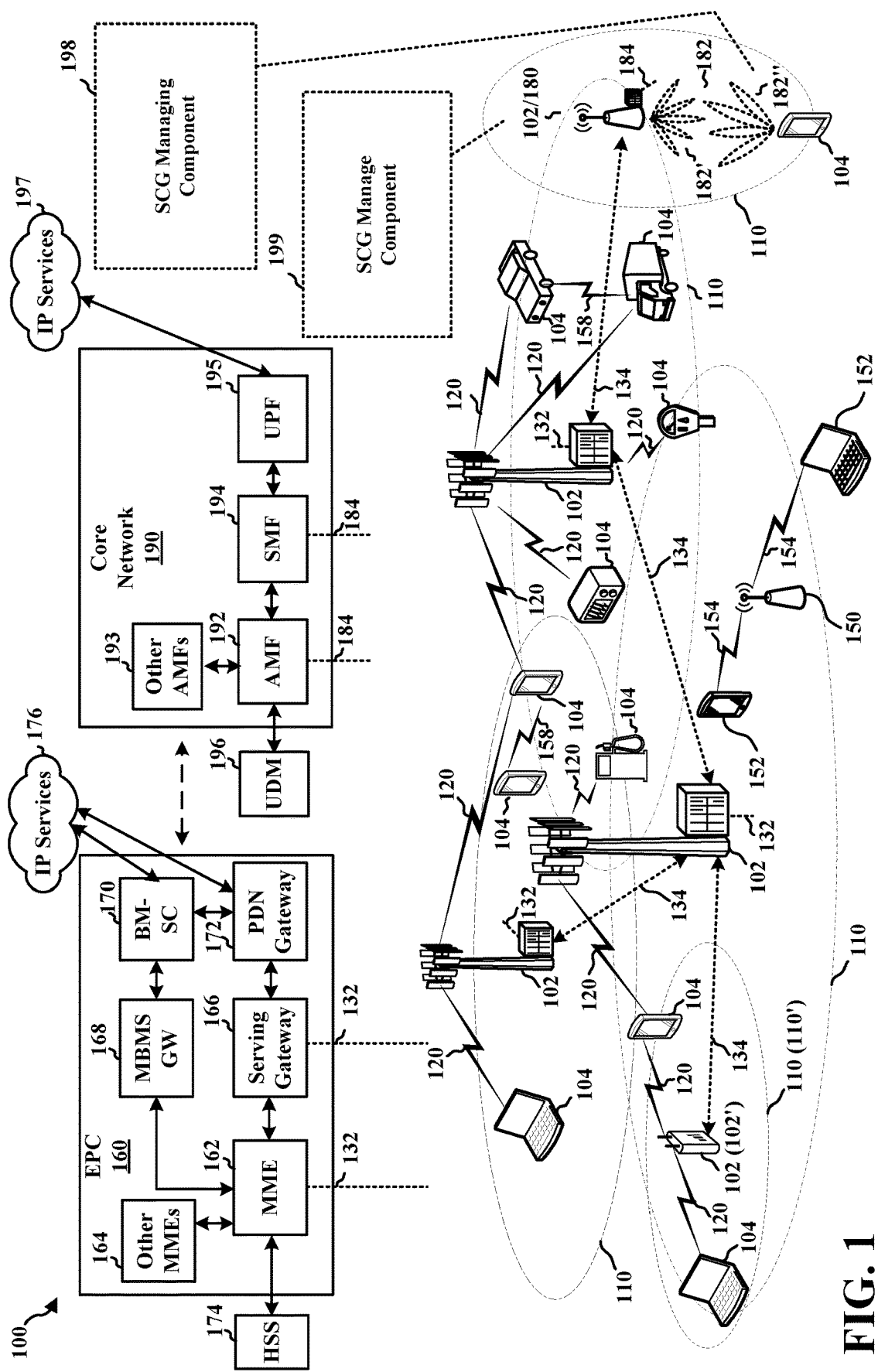
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronic s Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may include an SCG managing component 198 configured to transmit, to the base station 180, a registration request comprising first S-NSSAI associated with a first network slice and second S-NSSAI associated with a second network slice. The SCG managing component 198 may also be configured to receive, from the base station 180, a registration accept message associated with the first network slice and the second network slice. The SCG managing component 198 may also be configured to initiate a first inactivity timer for the MCG and a second inactivity timer for the SCG. In certain aspects, the base station 180 may include SCG manage component 199. The SCG manage component 199 may be configured to receive, from the UE 104, a registration request comprising first S-NSSAI associated with a first network slice and second S-NSSAI associated with a second network slice. The SCG manage component 199 may also be configured to transmit, to the UE 104, a registration accept message associated with the first network slice and the second network slice. The SCG manage component 199 may also be configured to initiate a first inactivity timer for the MCG and a second inactivity timer for the SCG. Although the following description may be focused on 5G NR, the concepts described herein may be applicable to other similar areas, such as LTE, LTE-A, CDMA, GSM, and other wireless technologies.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 $\mu$s. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK)/negative ACK (NACK) feedback. The PUSCH carries data, and may additionally be used to carry a buffer status report (BSR), a power headroom report (PHR), and/or UCI.

Figure 3:
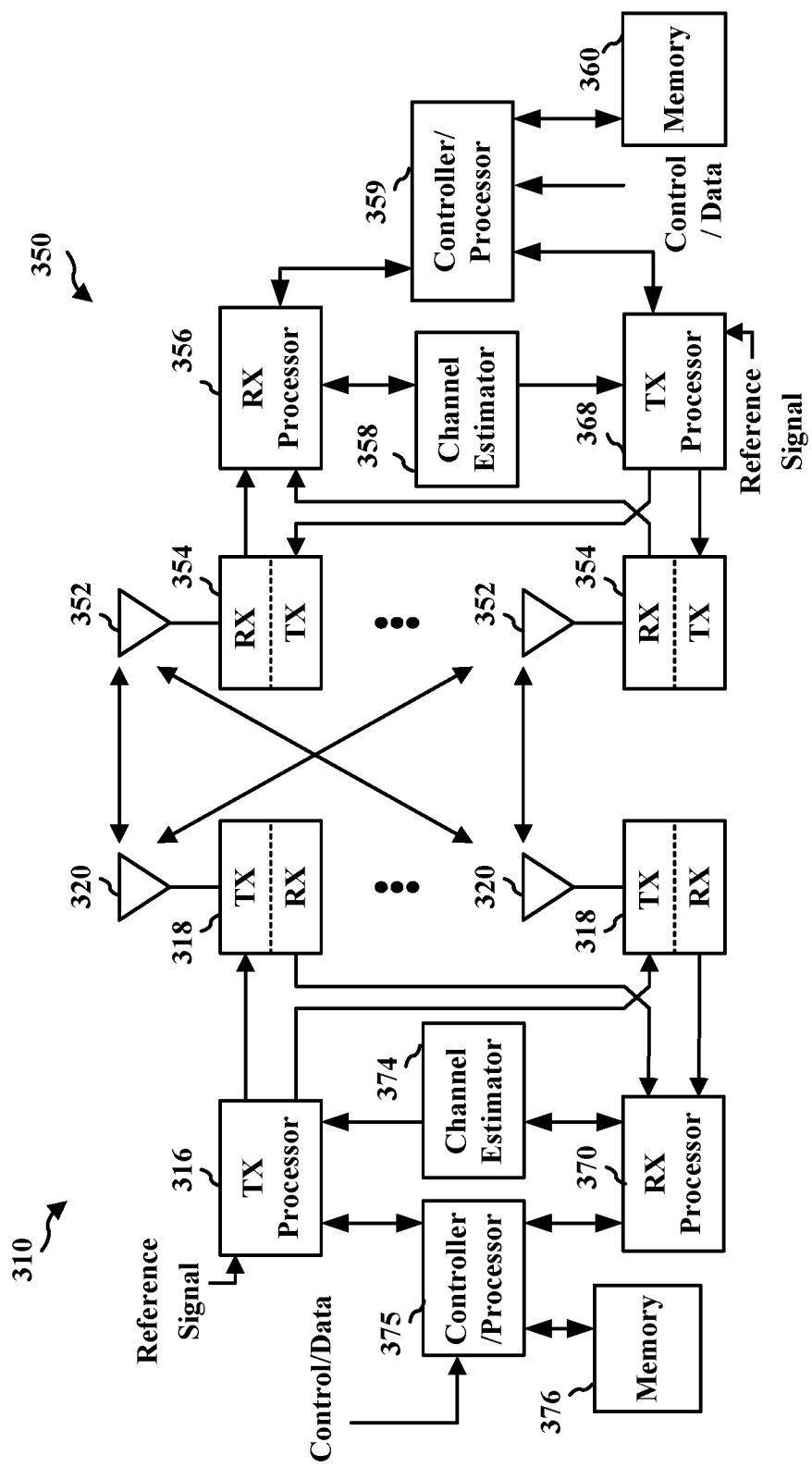
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate an RF carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with SCG managing component 198 of FIG. 1.

At least one of the TX processor 316, the RX processor 370, and the controller/processor 375 may be configured to perform aspects in connection with SCG manage component 199 of FIG. 1.

To enable faster access to cells supporting network slices for UEs, slice based cell reselection under network control and slice based random access channel (RACH) configuration may be facilitated by the methods, computer programs products, and apparatuses provided herein.

Figure 4:
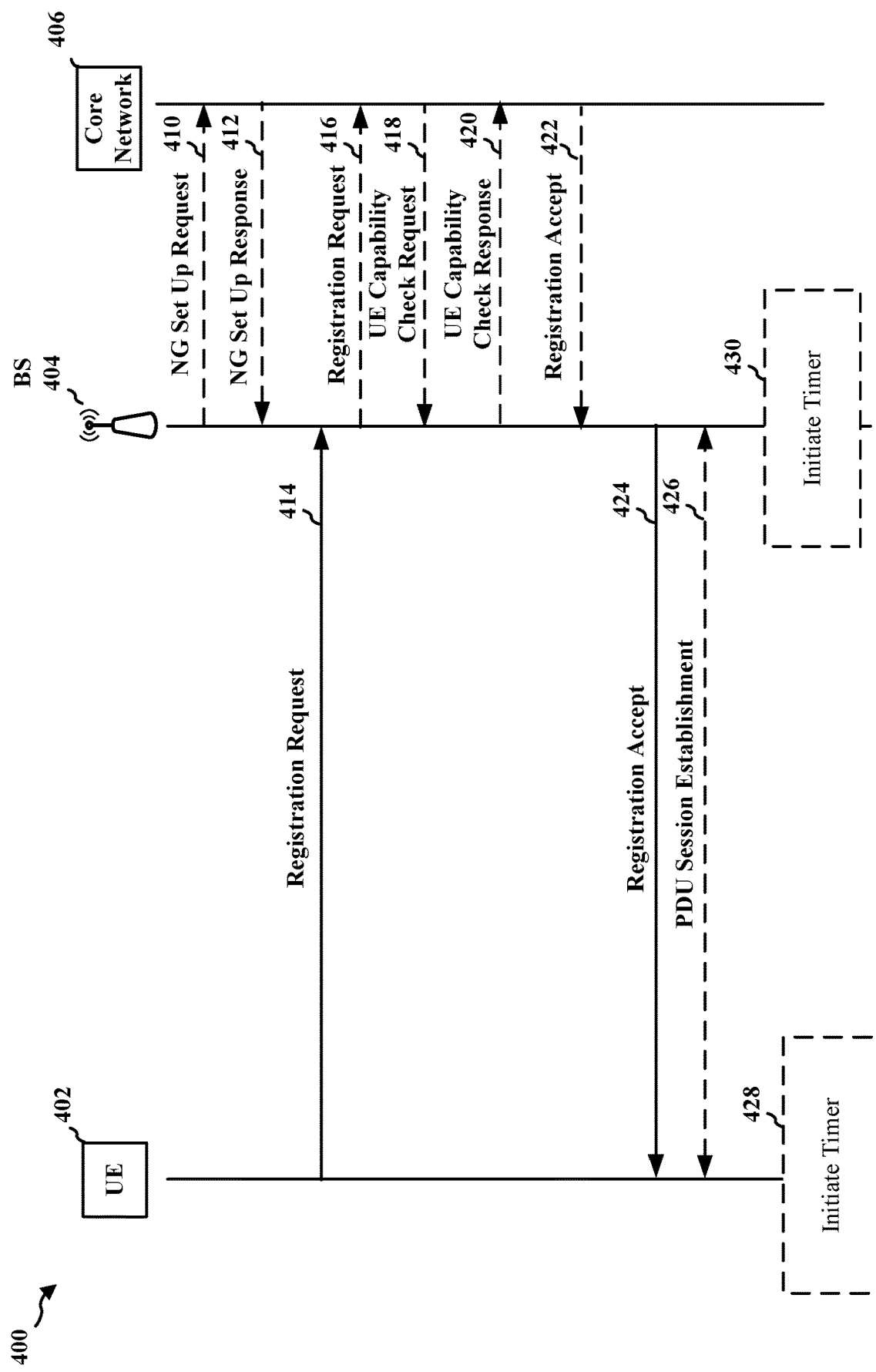
FIG. 4 illustrates an example communication between a base station and a UE.

FIG. 4 illustrates an example communication 400 for supporting dual connectivity between two network slices and slice based cell reselection. As illustrated in FIG. 4, a UE 402 may transmit a registration request 414 to a base station 404. In some aspects, the registration request 414 may be a RRC message, e.g., RRC message 5, that includes access-stratum (AS) requested NSSAI associated with one or more S-NSSAIs. In some aspects, the registration request 414 may be a non-access-stratum (NAS) registration request that includes requested NSSAI associated with one or more S-NSSAIs. Each S-NSSAI in the requested NSSAI may be associated with a requested network slice. In one example, the registration request may include three S-NSSAIs associated with three slices.

After receiving the registration request 414, the base station 404 may transmit a registration request 416 to a core network 406, such as an AMF in the core network 406, to facilitate connection on the one or more network slices. The base station 404 may have previously completed a new generation (NG) set up with the core network 406 by exchanging an NG setup request 410 and an NG setup response 412. The NG set up request 410 may include a PLMN list, a supported tracking area (TA) list, and one S-NSSAI list (which may indicate network slices) per tracking area identity (TAI). The NG set up response 412 may include an AMF name and a PLMN support list.

After receiving the registration request 416, the core network 406 may transmit a UE capability check request 418 to the base station 404 to determine a base station capability and a UE capability to support the requested network slices in the registration request 416. In response to the UE capability check request 418, the base station 404 may transmit a UE capability check response 420 that indicates network slices (such as by including S-NSSAI) supported by the base station 404 and the UE 402. After receiving the UE capability check response 420, the core network 406 may transmit a registration accept message 422 to the base station 404. The registration accept message 422 may include one or more allowed S-NSSAIs based on requested network slices that are supported. In some aspects, the one or more allowed S-NSSAIs may be a minimal common set of the requested NSSAI, subscribed NSSAI, and current TAI supported NSSAI. In some aspects, the registration accept message 422 may further include slice priorities associated with each network slice associated with each of the allowed S-NSSAIs. The slice priorities may be based on UE or network policy.

After receiving the registration accept message 422, the base station 404 may transmit a registration accept message 424 to the UE 402. The registration accept message 424 may also include the slice priorities and the one or more allowed S-NSSAIs. After receiving the registration accept message 424, the UE 402 may establish PDU sessions with the base station 404 in PDU session establishment 426. In some aspects, one PDU session is established for each network slice associated with each allowed S-NSSAI. In some aspects, the network slice with the highest priority may be served by an MCG bearer and the network slice with a second highest priority may be served by an SCG bearer. After the network slices are served by the MCG/SCGs, the base station 404 may initiate, at 430, one inactivity timer for the MCG and one inactivity timer for the SCG. In some aspects, the UE 402 may initiate, at 428, one inactivity timer for the MCG and one inactivity timer for the SCG. In some aspects, the inactivity timer for the MCG and the inactivity timer for the SCG may be independent.

Figure 5:
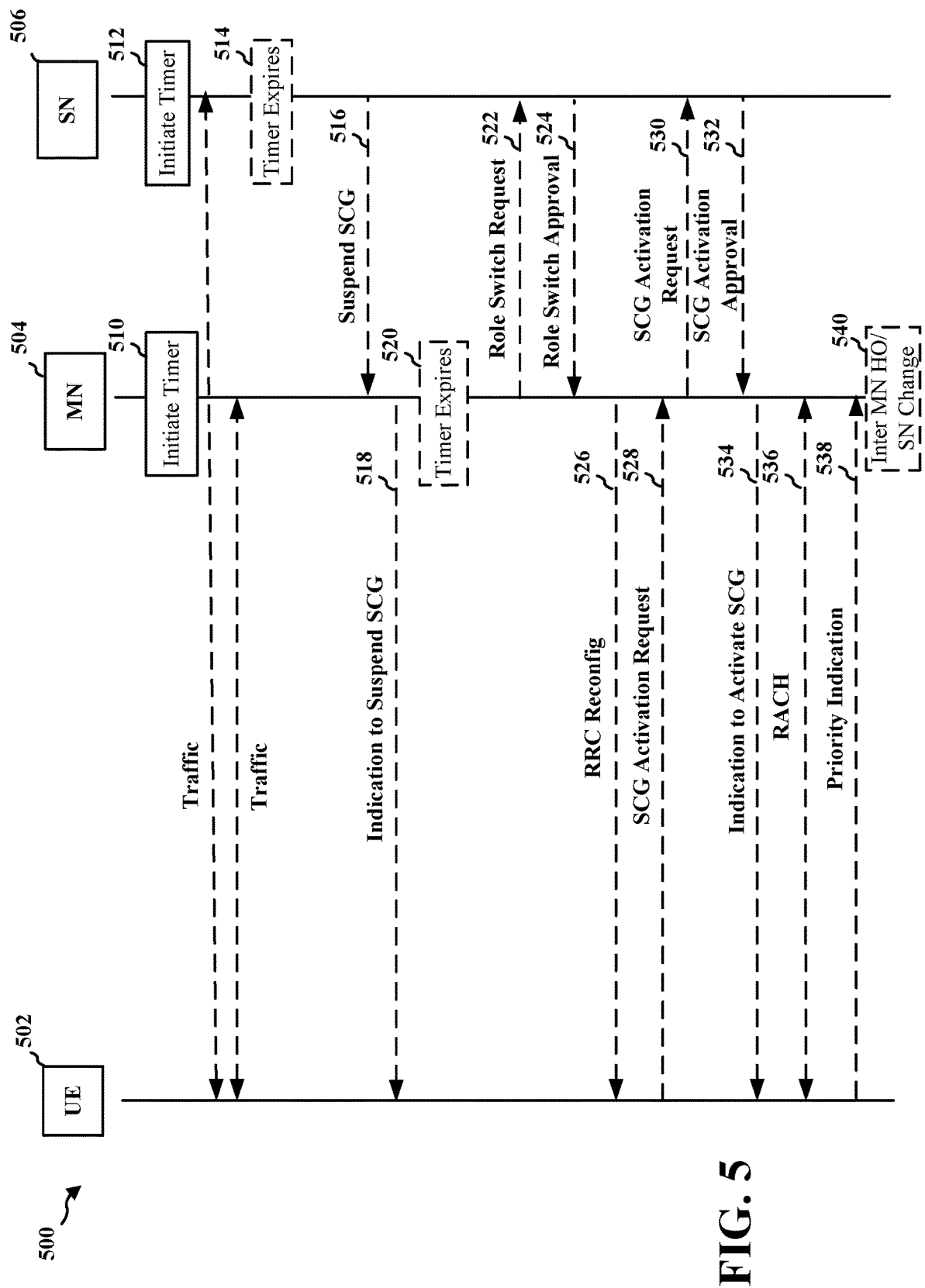
FIG. 5 illustrates an example communication between a base station and a UE.

Continuing with FIG. 5 that illustrates an example communication flow 500 that includes a UE 502 (which may be the UE 402), a master node (MN) 504 (which may be an MN of the base station 404 associated with MCG), and a secondary node (which may be an SN of the base station 404 associated with SCG) 506. At 510 and 512, the inactivity timers for the MCG and the SCG are initiated. In some aspects, the two inactivity timers may be configured via RRC signaling.

The inactivity timer for the MCG may be reset upon uplink or downlink communication on the MCG. The inactivity timer for the SCG may be reset upon uplink or downlink communication on the SCG. After the inactivity timer for the SCG expires at 514, SCG may be suspended to facilitate a UE power saving of UE 502. To suspend the SCG, the MN 504 may transmit an indication to suspend SCG 518 to the UE 502 based on a SN's instruction to suspend SCG 516. Upon receiving the indication to suspend SCG 518, the UE 502 may suspend the SCG.

In some aspects, after the inactivity timer for the MCG expires at 520, a role switch between MCG and SCG may be triggered. In some aspects, to facilitate the role switch, the MN 504 may transmit a role switch request 522 to the SN 506 and may receive a role switch approval 524 from the SN 506. The role switch may switch the network slice currently being served by the MCG to be served by the SCG and switch the network slice currently served by the SCG to be served by the MCG. After receiving the role switch approval 524, the MN 504 may transmit an RRC reconfiguration 526 to the UE 502 to complete the role switch.

In some aspects, if the SCG is suspended, after determining pending uplink traffic on a network slice served by the SCG, the UE 502 may transmit an SCG activation request 528 to the MN 504 to activate the SCG. The MN 504 may trigger the SCG activation accordingly by transmitting an SCG activation request 530 to the SN 506 and receiving an SCG activation approval 532 from the SN 506. After receiving the SCG activation approval 532 from the SN 506, the MN 504 may transmit an indication to activate SCG 534. In some aspects, a RACH procedure 536 may follow accordingly. In some aspects, the MN 504 may trigger the SCG activation by transmitting an SCG activation request 530 to the SN 506 and receiving an SCG activation approval 532 from the SN 506 based on pending downlink traffic.

In some aspects, if pending downlink communication is determined by the base station on the third network slice not served by the MCG or the SCG, and if a priority associated with the third network slice is higher than either slice served by the MCG or the SCG, the base station may trigger an inter-MN handover (HO) at 540 if the network slice served by the MCG has a lower priority than the network slice served by the SCG or may trigger SN change at 540 if the slice served by the SCG has a lower priority than the network slice served by the MCG. If the priority associated with the third network slice is lower than the priorities associated with the network slice served by the SCG and the network slice served by the MCG, the base station may trigger the SN change at 540 if the SCG is suspended. If pending uplink communication is determined by the UE 502 on the third network slice not served by the MCG or the SCG, the UE 502 may transmit a priority indication 538 indicating the priority of the third network slice to the base station via RRC signaling (such as via UE assistance information (UAI)) or a medium access control (MAC) control element (MAC-CE). The base station may trigger the inter-MN HO or SN change at 540 based on the priority indication.

Figure 6A:
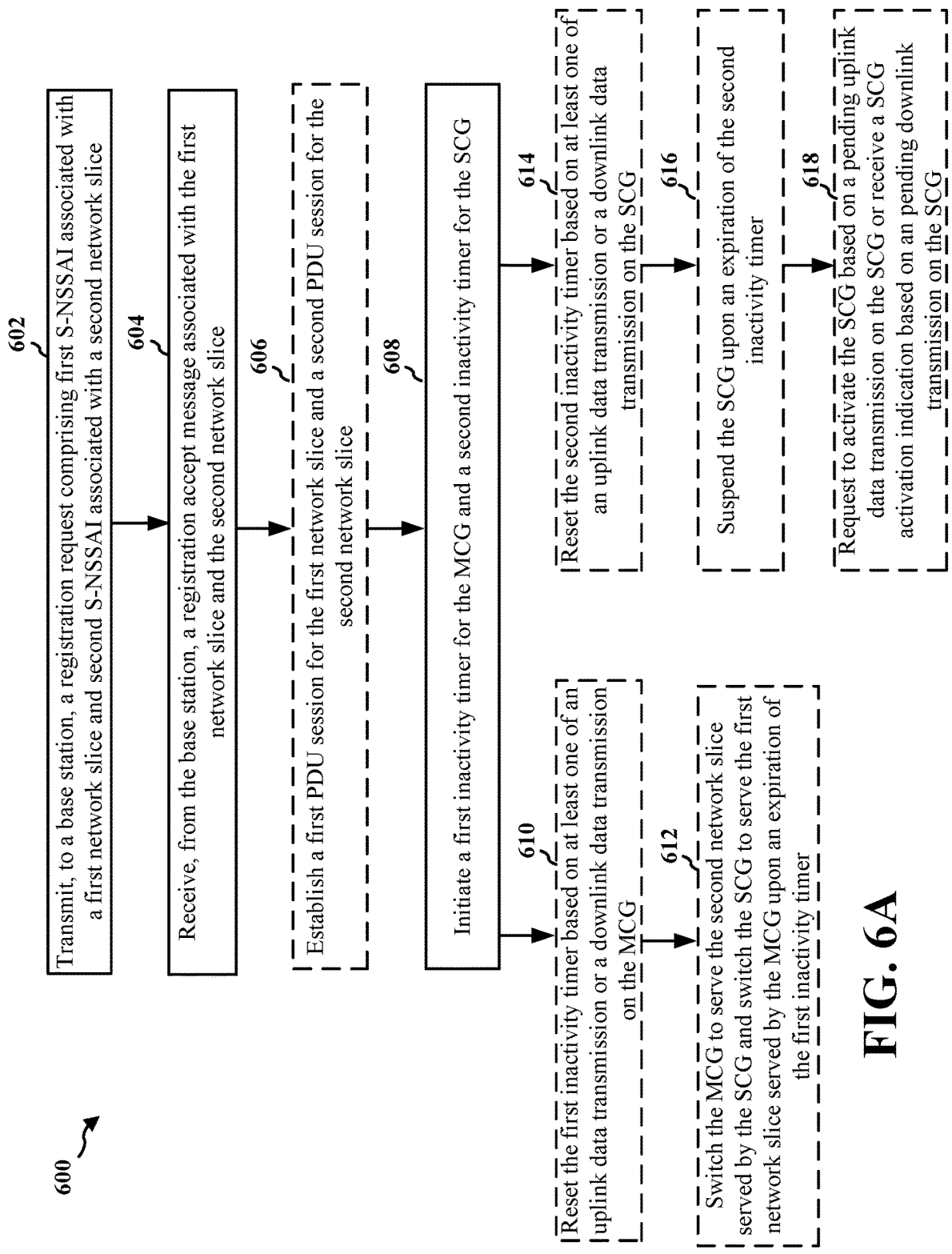

FIGS. 6A-6C are flowcharts 600, 650, and 655 of a method of wireless communication. The method may be performed by a UE (e.g., the UE 104, the UE 402, the UE 502; the apparatus 802). Optional aspects are illustrated with a dashed line.

At 602, the UE may transmit, to a base station, a registration request comprising first S-NSSAI associated with a first network slice and second S-NSSAI associated with a second network slice. The registration request may correspond to the registration request 414 of FIG. 4. In some aspects, the registration request may include third S-NSSAI associated with a third network slice and the registration accept message may be associated with the third network slice.

At 604, the UE may receive, from the base station, a registration accept message associated with the first network slice and the second network slice. The first network slice may be associated with a first priority higher than a second priority associated with the second network slice and the first network slice may be served by an MCG and the second network slice being served by an SCG. The registration accept message may correspond to the registration accept message 424 of FIG. 4. In some aspects, the first priority and the second priority may be determined by the UE. In some aspects, the first priority and the second priority may be determined based on a network policy.

At 606, the UE may establish a first PDU session for the first network slice and a second PDU session for the second network slice. The PDU session establishment may correspond to the PDU session establishment 426 of FIG. 4.

At 608, the UE may initiate a first inactivity timer for the MCG and a second inactivity timer for the SCG. The timers may correspond to the timers in the initiate timer step 428 of FIG. 4.

At 610, the UE may reset the first inactivity timer based on at least one of an uplink data transmission or a downlink data transmission on the MCG. The first inactivity timer may correspond to the timer in the initiate timer step 510 of FIG. 5.

At 612, the UE may switch the MCG to serve the second network slice served by the SCG upon an expiration of the first inactivity timer. The UE may also switch the SCG to serve the first network slice served by the MCG upon an expiration of the first inactivity timer.

At 614, the UE may reset the second inactivity timer based on at least one of an uplink data transmission or a downlink data transmission on the SCG. The second inactivity timer may correspond to the timer in the initiate timer step 512 of FIG. 5.

At 616, the UE may suspend the SCG upon an expiration of the second inactivity timer. For example, the UE may suspend the SCG by transmitting an indication to suspend SCG.

At 618, the UE may request to activate the SCG based on a pending uplink data transmission on the SCG via sending UAI or a MAC-CE to the MCG. The request to activate the SCG may correspond to the SCG activation request 528 of FIG. 5.

At 622, the UE may receive an inter-master handover indication or a secondary node change from the base station. In some aspects, for an inter-master handover indication, a third priority associated with the third network slice may be higher than the first priority or the second priority associated with the network slice served by the MCG which may have a lower priority than the first priority or the second priority associated with the network slice served by the SCG. In some aspects, for a secondary node change, a third priority associated with the third network slice may be higher than the first priority or the second priority associated with the network slice served by the SCG which may have lower priority than the first priority or the second priority associated with the network slice served by the MCG or a third priority associated with the third network slice may be lower than the first priority and the second priority and the SCG is suspended.

At 624, the UE may perform the secondary node change or the inter-master handover. For example, the secondary node change or the inter-master handover may be performed jointly by the UE and the base station.

At 626, the UE may be configured to receive a downlink data transmission on the third network slice. In some aspects, the downlink data transmission may be associated with the third priority on the third network slice.

At 630, the UE may determine pending uplink data transmission on the third network slice. The pending uplink data transmission may be associated with the third priority on the third network slice. In some aspects, the third priority may be determined by the UE.

At 632, the UE may transmit a priority indication associated with the third network slice to the base station. The priority indication may indicate the third priority.

At 634, the UE may receive an inter-master handover indication or a secondary node change. In some aspects, for an inter-master handover indication, the third priority associated with the third network slice may be higher than the first priority or the second priority associated with the network slice served by the MCG which may have lower priority than the first priority or the second priority associated with the network slice served by the SCG. In some aspects, for a secondary node change, the third priority associated with the third network slice may be higher than the first priority or the second priority associated with the network slice served by the SCG which may have a lower priority than the first priority or the second priority associated with the network slice served by the MCG or the third priority associated with the third network slice may be lower than the first priority and the second priority and the SCG may be suspended.

At 636, the UE may perform the secondary node change or the inter-master handover. For example, the secondary node change or the inter-master handover may be performed jointly by the UE and the base station.

At 638, the UE may transmit uplink data on the third network slice. In some aspects, the uplink data transmission may be associated with the third priority on the third network slice.

Figure 7A:
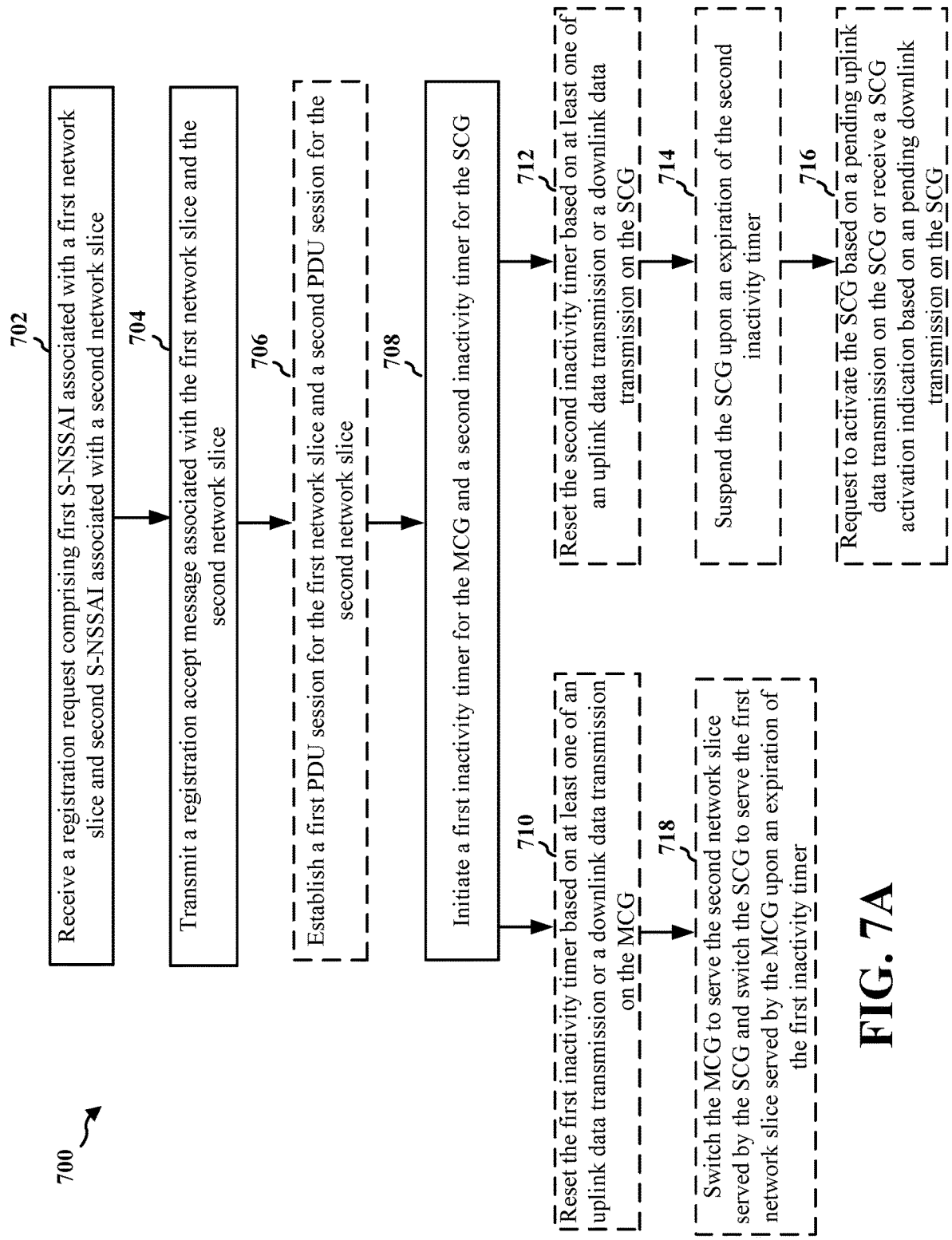
FIGS. 7A-7C are flowcharts of a method of wireless communication at a base station.
Figure 7C:
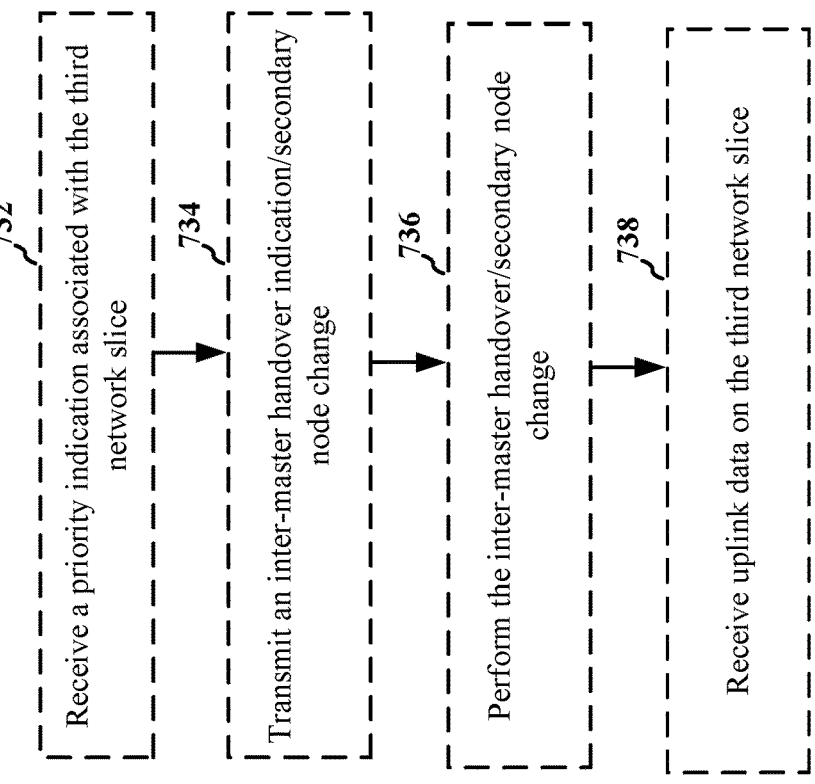
Figure 7B:
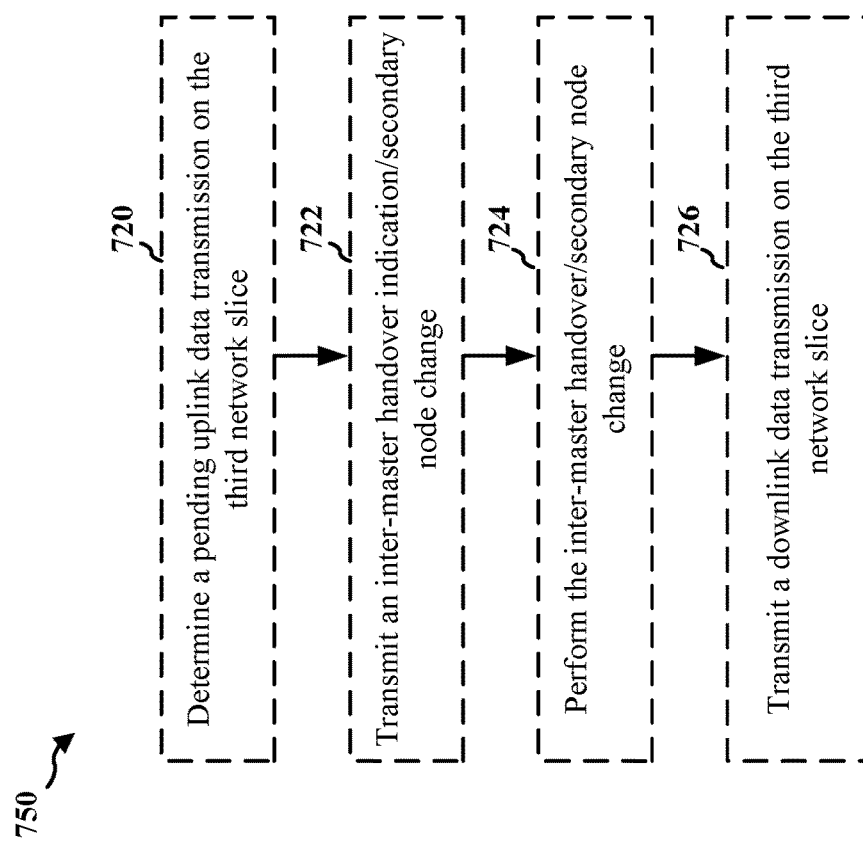

FIGS. 7A-7C are flowcharts 700, 750, and 755 of a method of wireless communication. The method may be performed by a base station (e.g., the base station 102/180, the base station 404, the base station with MN 504 and SN 506; the apparatus 902). Optional aspects are illustrated with a dashed line.

At 702, the base station may receive, from a UE, a registration request comprising first S-NSSAI associated with a first network slice and second S-NSSAI associated with a second network slice. The registration request may correspond to the registration request 414 of FIG. 4. In some aspects, the registration request may include third S-NSSAI associated with a third network slice and the registration accept message may be associated with the third network slice.

At 704, the base station may transmit, to the UE, a registration accept message associated with the first network slice and the second network slice. The first network slice may be associated with a first priority higher than a second priority associated with the second network slice and the first network slice may be served by an MCG and the second network slice being served by an SCG. The registration accept message may correspond to the registration accept message 424 of FIG. 4. In some aspects, the first priority and the second priority may be determined by the base station. In some aspects, the first priority and the second priority may be determined based on a network policy.

At 706, the base station may establish a first PDU session for the first network slice and a second PDU session for the second network slice. The PDU session establishment may correspond to the PDU session establishment 426 of FIG. 4.

At 708, the base station may initiate a first inactivity timer for the MCG and a second inactivity timer for the SCG. The timers may correspond to the timers in the initiate timer step 428 of FIG. 4.

At 710, the base station may reset the first inactivity timer based on at least one of an uplink data transmission or a downlink data transmission on the MCG. The first inactivity timer may correspond to the timer in the initiate timer step 510 of FIG. 5.

At 712, the base station may switch the MCG to serve the second network slice served by the SCG upon an expiration of the first inactivity timer. The base station may also switch the SCG to serve the first network slice served by the MCG upon an expiration of the first inactivity timer.

At 714, the base station may reset the second inactivity timer based on at least one of an uplink data transmission or a downlink data transmission on the SCG. The second inactivity timer may correspond to the timer in the initiate timer step 512 of FIG. 5.

At 716, the base station may suspend the SCG upon an expiration of the second inactivity timer. For example, the base station may suspend the SCG by receiving an indication to suspend SCG.

At 718, the base station may request to activate the SCG based on a pending uplink data transmission on the SCG via sending UAI or a MAC-CE to the MCG. The request to activate the SCG may correspond to the SCG activation request 528 of FIG. 5.

At 720, the base station may determine pending downlink data transmission on the third network slice. The pending downlink data transmission may be associated with the third priority on the third network slice. In some aspects, the third priority may be determined by the base station.

At 722, the base station may transmit an inter-master handover indication or a secondary node change to the UE. In some aspects, for an inter-master handover indication, a third priority associated with the third network slice may be higher than the first priority or the second priority associated with the network slice served by the MCG which may have lower priority than the first priority or the second priority associated with the network slice served by the SCG. In some aspects, for a secondary node change, a third priority associated with the third network slice may be higher than the first priority or the second priority associated with the network slice served by the SCG which may have lower priority than the first priority or the second priority associated with the network slice served by the MCG or a third priority associated with the third network slice may be lower than the first priority and the second priority and the SCG is suspended.

At 724, the base station may perform the secondary node change or the inter-master handover. For example, the secondary node change or the inter-master handover may be performed jointly by the base station and the base station.

At 726, the base station may be configured to transmit a downlink data transmission on the third network slice. In some aspects, the downlink data transmission may be associated with the third priority on the third network slice.

At 732, the base station may receive a priority indication associated with the third network slice to the base station. The priority indication may indicate the third priority.

At 734, the base station may transmit an inter-master handover indication or a secondary node change. In some aspects, for inter-master handover indication, the third priority associated with the third network slice may be higher than the first priority or the second priority associated with the network slice served by the MCG which may have a lower priority than the first priority or the second priority associated with the network slice served by the SCG. In some aspects, for a secondary node change, the third priority associated with the third network slice may be higher than the first priority or the second priority associated with the network slice served by the SCG which may have lower priority than the first priority or the second priority associated with the network slice served by the MCG or the third priority associated with the third network slice may be lower than the first priority and the second priority and the SCG may be suspended.

At 736, the base station may perform the secondary node change or the inter-master handover. For example, the secondary node change or the inter-master handover may be performed jointly by the base station and the base station.

At 738, the base station may receive uplink data on the third network slice. In some aspects, the uplink data transmission may be associated with the third priority on the third network slice.

Figure 8:
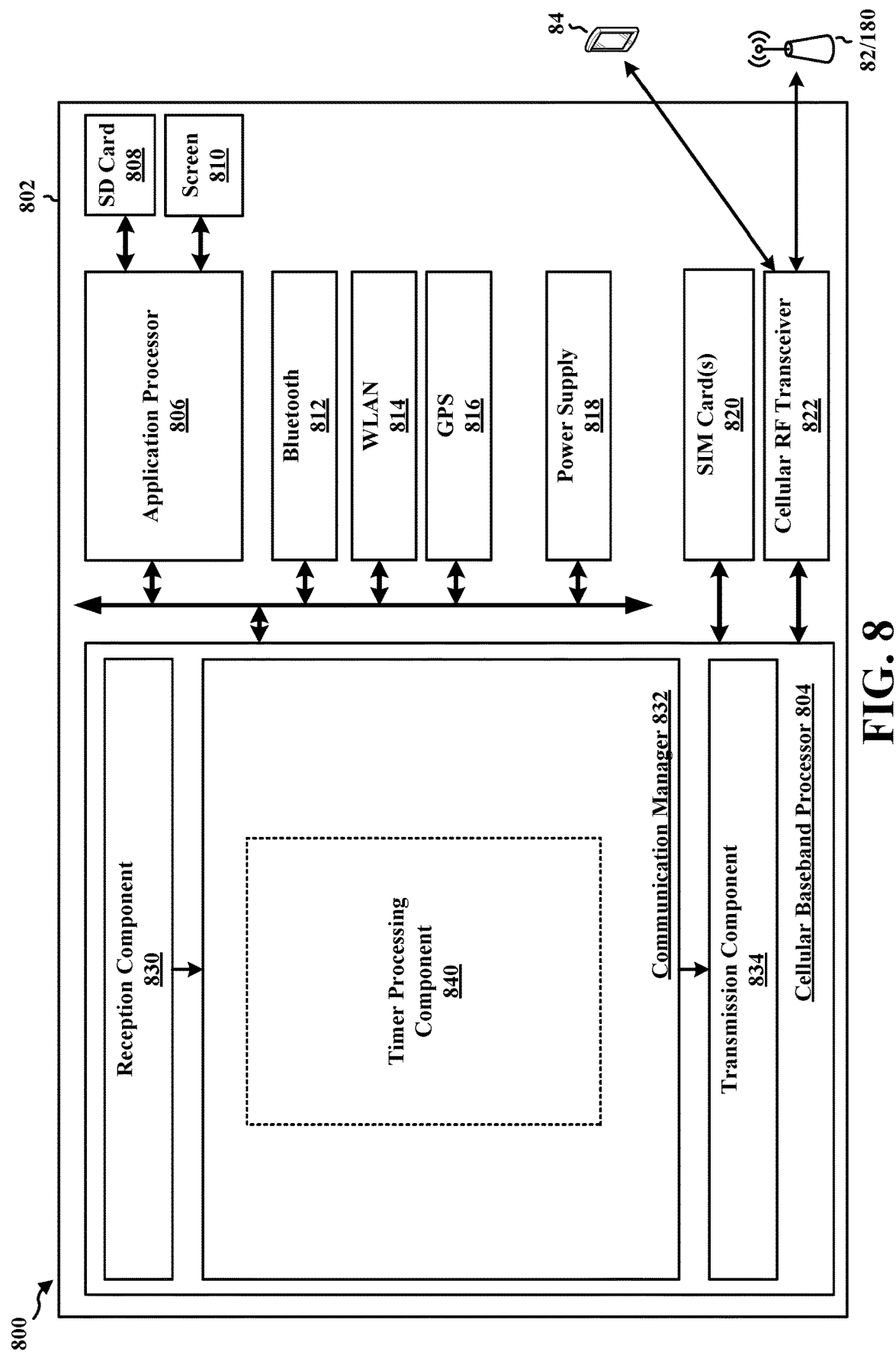
FIG. 8 is a diagram illustrating an example of a hardware implementation for an example apparatus.

FIG. 8 is a diagram 800 illustrating an example of a hardware implementation for an apparatus 802. The apparatus 802 is a UE and includes a cellular baseband processor 804 (also referred to as a modem) coupled to a cellular RF transceiver 822 and one or more subscriber identity modules (SIM) cards 820, an application processor 806 coupled to a secure digital (SD) card 808 and a screen 810, a Bluetooth module 812, a wireless local area network (WLAN) module 814, a Global Positioning System (GPS) module 816, and a power supply 818. The cellular baseband processor 804 communicates through the cellular RF transceiver 822 with the UE 104 and/or BS 102/180. The cellular baseband processor 804 may include a computer-readable medium/memory. The computer-readable medium/memory may be non-transitory. The cellular baseband processor 804 is responsible for general processing, including the execution of software stored on the computer-readable medium/memory. The software, when executed by the cellular baseband processor 804, causes the cellular baseband processor 804 to perform the various functions described supra. The computer-readable medium/memory may also be used for storing data that is manipulated by the cellular baseband processor 804 when executing software. The cellular baseband processor 804 further includes a reception component 830, a communication manager 832, and a transmission component 834.

In some aspects, the reception component 830 may be configured to receive a registration accept message associated with the first network slice and the second network slice, e.g., as described in connection with 602 of FIG. 6A. In some aspects, the reception component 830 may be configured to establish a first PDU session for the first network slice and a second PDU session for the second network slice, e.g., as described in connection with 606 of FIG. 6A. In some aspects, the reception component 830 may be configured to receive an inter-master handover indication/secondary node change, e.g., as described in connection with 622/634 of FIGS. 6B and 6C. In some aspects, the reception component 830 may be configured to receive a downlink data transmission on the third network slice, e.g., as described in connection with 626 of FIG. 6B.

In some aspects, the transmission component 834 may be configured to transmit a registration request comprising first S-NSSAI associated with a first network slice and second S-NSSAI associated with a second network slice, e.g., as described in connection with 602 of FIG. 6A. In some aspects, the transmission component 834 may be configured to establish a first PDU session for the first network slice and a second PDU session for the second network slice, e.g., as described in connection with 606 of FIG. 6A. In some aspects, the transmission component 834 may be configured to request to activate the SCG based on a pending uplink data transmission on the SCG via sending UAI or a MAC-CE to the MCG, e.g., as described in connection with 616 of FIG. 6A. In some aspects, the transmission component 834 may be configured to perform the inter-master handover, e.g., as described in connection with 624/636 of FIGS. 6B and 6C. In some aspects, the transmission component 834 may be configured to perform the secondary node change, e.g., as described in connection with 624/636 of FIGS. 6B and 6C. In some aspects, the transmission component 834 may be configured to transmit a priority indication associated with the third network slice, e.g., as described in connection with 632 of FIG. 6C. In some aspects, the transmission component 834 may be configured to transmit uplink data on the third network slice, e.g., as described in connection with 638 of FIG. 6C.

The communication manager 832 includes the one or more illustrated components. The components within the communication manager 832 may be stored in the computer-readable medium/memory and/or configured as hardware within the cellular baseband processor 804. The cellular baseband processor 804 may be a component of the UE 350 and may include the memory 360 and/or at least one of the TX processor 368, the RX processor 356, and the controller/processor 359. In one configuration, the apparatus 802 may be a modem chip and include just the baseband processor 804, and in another configuration, the apparatus 802 may be the entire UE (e.g., see 350 of FIG. 3) and include the aforediscussed additional modules of the apparatus 802.

The communication manager 832 includes a timer processing component 840 that may be configured to initiate a first inactivity timer for the MCG and a second inactivity timer for the SCG, reset the first inactivity timer based on at least one of an uplink data transmission or a downlink data transmission on the MCG, reset the second inactivity timer based on at least one of an uplink data transmission or a downlink data transmission on the SCG, suspend the SCG upon an expiration of the second inactivity timer, switch the MCG to serve the second network slice served by the SCG upon an expiration of the first inactivity timer, and switch the SCG to serve the first network slice served by the MCG upon an expiration of the first inactivity timer as described in conjunction with 608, 610, 612, 614, and 618 of FIG. 6A.

The apparatus may include additional components that perform each of the blocks of the algorithm in the aforementioned flowcharts of FIG. 6A-6C. As such, each block in the aforementioned flowcharts of FIG. 6A-6C may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 802, and in particular the cellular baseband processor 804, includes means for transmitting, to a base station, a registration request comprising first S-NSSAI associated with a first network slice and second S-NSSAI associated with a second network slice. The cellular baseband processor 804 may further include means for receiving, from the base station, a registration accept message associated with the first network slice and the second network slice. The cellular baseband processor 804 may further include means for initiating a first inactivity timer for the MCG and a second inactivity timer for the SCG. The cellular baseband processor 804 may further include means for establishing a first PDU session for the first network slice and a second PDU session for the second network slice. The cellular baseband processor 804 may further include means for resetting the first inactivity timer based on at least one of an uplink data transmission or a downlink data transmission on the MCG. The cellular baseband processor 804 may further include means for resetting the second inactivity timer based on at least one of an uplink data transmission or a downlink data transmission on the SCG. The cellular baseband processor 804 may further include means for suspending the SCG upon an expiration of the second inactivity timer. The cellular baseband processor 804 may further include means for requesting to activate the SCG based on a pending uplink data transmission on the SCG via sending UAI or a MAC-CE to the MCG. The cellular baseband processor 804 may further include means for receiving, from the MCG, an SCG activation indication from the base station based on a pending downlink data transmission on the SCG. The cellular baseband processor 804 may further include means for switching the MCG to serve the second network slice served by the SCG upon an expiration of the first inactivity timer. The cellular baseband processor 804 may further include means for switching the SCG to serve the first network slice served by the MCG upon an expiration of the first inactivity timer. The cellular baseband processor 804 may further include means for receiving an inter-master handover indication from the base station. The cellular baseband processor 804 may further include means for performing the inter-master handover. The cellular baseband processor 804 may further include means for receiving a downlink data transmission on the third network slice. The cellular baseband processor 804 may further include means for receiving a secondary node change from the base station. The cellular baseband processor 804 may further include means for performing the secondary node change. The cellular baseband processor 804 may further include means for receiving a downlink data transmission on the third network slice. The cellular baseband processor 804 may further include means for determining a pending uplink data transmission on the third network slice. The cellular baseband processor 804 may further include means for transmitting a priority indication associated with the third network slice to the base station. The cellular baseband processor 804 may further include means for receiving an inter-master handover indication from the base station. The cellular baseband processor 804 may further include means for receiving a secondary node change indication from the base station. The cellular baseband processor 804 may further include means for performing the secondary node change. The cellular baseband processor 804 may further include means for performing the inter-master handover. The cellular baseband processor 804 may further include means for transmitting uplink data on the third network slice. The aforementioned means may be one or more of the aforementioned components of the apparatus 802 configured to perform the functions recited by the aforementioned means. As described supra, the apparatus 802 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 9:
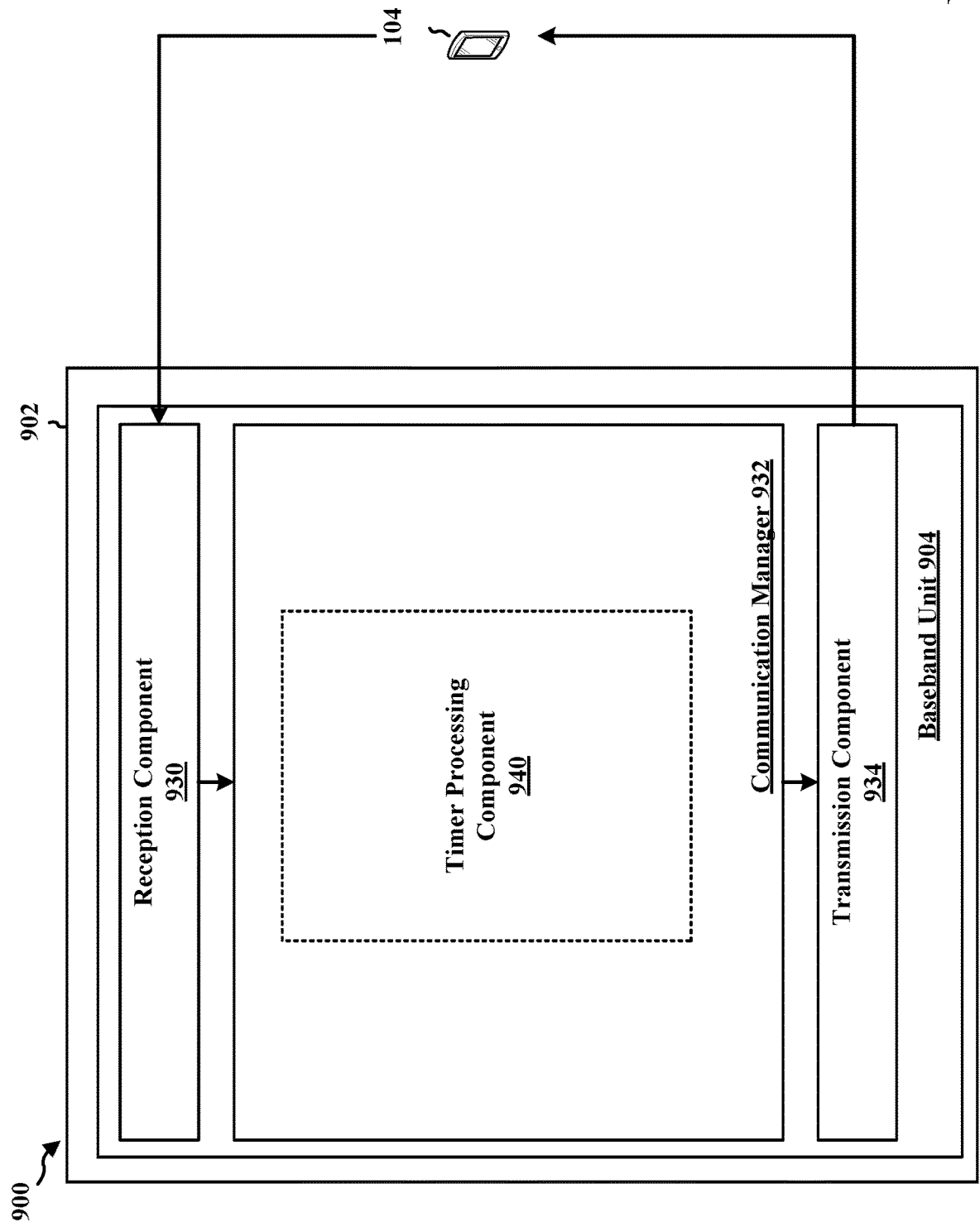
FIG. 9 is a diagram illustrating an example of a hardware implementation for an example apparatus.

FIG. 9 is a diagram 900 illustrating an example of a hardware implementation for an apparatus 902. The apparatus 902 is a BS and includes a baseband unit 904. The baseband unit 904 may communicate through a cellular RF transceiver with the UE 104. The baseband unit 904 may include a computer-readable medium/memory. The baseband unit 904 is responsible for general processing, including the execution of software stored on the computer-readable medium/memory. The software, when executed by the baseband unit 904, causes the baseband unit 904 to perform the various functions described supra. The computer-readable medium/memory may also be used for storing data that is manipulated by the baseband unit 904 when executing software. The baseband unit 904 further includes a reception component 930, a communication manager 932, and a transmission component 934.

In some aspects, the transmission component 934 may be configured to transmit a registration accept message associated with the first network slice and the second network slice, e.g., as described in connection with 702 of FIG. 7A. In some aspects, the transmission component 934 may be configured to establish a first PDU session for the first network slice and a second PDU session for the second network slice, e.g., as described in connection with 706 of FIG. 7A. In some aspects, the transmission component 934 may be configured to transmit an inter-master handover indication/secondary node change, e.g., as described in connection with 722/634 of FIGS. 7B and 7C. In some aspects, the transmission component 934 may be configured to transmit a downlink data transmission on the third network slice, e.g., as described in connection with 726 of FIG. 7B.

In some aspects, the reception component 930 may be configured to receive a registration request comprising first S-NSSAI associated with a first network slice and second S-NSSAI associated with a second network slice, e.g., as described in connection with 702 of FIG. 7A. In some aspects, the reception component 930 may be configured to establish a first PDU session for the first network slice and a second PDU session for the second network slice, e.g., as described in connection with 706 of FIG. 7A. In some aspects, the reception component 930 may be configured to receive a request to activate the SCG based on a pending uplink data transmission on the SCG via receiving UAI or a MAC-CE to the MCG, e.g., as described in connection with 716 of FIG. 7A. In some aspects, the reception component 930 may be configured to perform the inter-master handover, e.g., as described in connection with 724/636 of FIGS. 7B and 7C. In some aspects, the reception component 930 may be configured to perform the secondary node change, e.g., as described in connection with 724/636 of FIGS. 7B and 7C. In some aspects, the reception component 930 may be configured to receive a priority indication associated with the third network slice, e.g., as described in connection with 732 of FIG. 7C. In some aspects, the reception component 930 may be configured to receive uplink data on the third network slice, e.g., as described in connection with 738 of FIG. 7C.

The communication manager 932 includes the one or more illustrated components. The components within the communication manager 932 may be stored in the computer-readable medium/memory and/or configured as hardware within the baseband unit 904. The baseband unit 904 may be a component of the BS 310 and may include the memory 376 and/or at least one of the TX processor 316, the RX processor 370, and the controller/processor 375.

The communication manager 932 includes a timer processing component 940 that may be configured to initiate a first inactivity timer for the MCG and a second inactivity timer for the SCG, reset the first inactivity timer based on at least one of an uplink data transmission or a downlink data transmission on the MCG, reset the second inactivity timer based on at least one of an uplink data transmission or a downlink data transmission on the SCG, suspend the SCG upon an expiration of the second inactivity timer, switch the MCG to serve the second network slice served by the SCG upon an expiration of the first inactivity timer, and switch the SCG to serve the first network slice served by the MCG upon an expiration of the first inactivity timer as described in conjunction with 708, 710, 712, 714, and 718 of FIG. 7A.

The apparatus may include additional components that perform each of the blocks of the algorithm in the aforementioned flowcharts of FIGS. 7A-7C. As such, each block in the aforementioned flowcharts of FIGS. 7A-7C may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 902, and in particular the baseband unit 904, includes means for receiving, from a UE, a registration request comprising first S-NSSAI associated with a first network slice and second S-NSSAI associated with a second network slice. The baseband unit 904 may further include means for transmitting, to the UE, a registration accept message associated with the first network slice and the second network slice. The baseband unit 904 may further include means for initiating a first inactivity timer for the MCG and a second inactivity timer for the SCG. The baseband unit 904 may further include means for establishing a first PDU session for the first network slice and a second PDU session for the second network slice. The baseband unit 904 may further include means for resetting the second inactivity timer based on at least one of an uplink data transmission or a downlink data transmission on the SCG. The baseband unit 904 may further include means for resetting the first inactivity timer based on at least one of an uplink data transmission or a downlink data transmission on the MCG. The baseband unit 904 may further include means for suspending the SCG upon an expiration of the second inactivity timer. The baseband unit 904 may further include means for receiving a request to activate the SCG based on a pending uplink data transmission on the SCG via receiving UAI or a MAC-CE to the MCG. The baseband unit 904 may further include means for transmitting, via the MCG, an SCG activation indication to the UE based on a pending downlink data transmission on the SCG. The baseband unit 904 may further include means for switching the MCG to serve the second network slice served by the SCG upon an expiration of the first inactivity timer. The baseband unit 904 may further include means for switching the SCG to serve the first network slice served by the MCG upon an expiration of the first inactivity timer. The baseband unit 904 may further include means for transmitting an inter-master handover indication to the UE. The baseband unit 904 may further include means for performing the inter-master handover. The baseband unit 904 may further include means for transmitting a secondary node change to the UE. The baseband unit 904 may further include means for performing the secondary node change. The baseband unit 904 may further include means for transmitting a downlink data transmission on the third network slice. The baseband unit 904 may further include means for determining a pending uplink data transmission on the third network slice. The baseband unit 904 may further include means for receiving a priority indication associated with the third network slice from the UE. The baseband unit 904 may further include means for transmitting an inter-master handover indication to the UE. The baseband unit 904 may further include means for performing the inter-master handover. The baseband unit 904 may further include means for transmitting a secondary node change indication to the UE. The baseband unit 904 may further include means for performing the secondary node change. The baseband unit 904 may further include means for receiving uplink data on the third network slice. The aforementioned means may be one or more of the aforementioned components of the apparatus 902 configured to perform the functions recited by the aforementioned means. As described supra, the apparatus 902 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication of a user equipment (UE), comprising:
    transmitting, to a base station, a registration request comprising first single network slice selection assistance information (S-NSSAI) associated with a first network slice and second S-NSSAI associated with a second network slice;
    receiving, from the base station, a registration accept message associated with the first network slice and the second network slice, the first network slice being associated with a first priority higher than a second priority associated with the second network slice, and the first network slice being served by a master cell group (MCG) and the second network slice being served by a secondary cell group (SCG); and
    initiating a first inactivity timer for the MCG and a second inactivity timer for the SCG.

2. The method of claim 1, wherein the first priority and the second priority are determined by the UE.

3. The method of claim 1, wherein the first priority and the second priority are determined based on a network policy.

4. The method of claim 1, further comprising:
    establishing a first protocol data unit (PDU) session for the first network slice and a second PDU session for the second network slice.

5. The method of claim 1, further comprising:
    resetting the first inactivity timer based on at least one of an uplink data transmission or a downlink data transmission on the MCG.

6. The method of claim 1, further comprising:
    resetting the second inactivity timer based on at least one of an uplink data transmission or a downlink data transmission on the SCG.

7. The method of claim 1, further comprising:
    suspending the SCG upon an expiration of the second inactivity timer.

8. The method of claim 7, further comprising:
    requesting to activate the SCG based on a pending uplink data transmission on the SCG via sending UE assistance information (UAI) or a medium access control (MAC) control element (MAC-CE) to the MCG.

9. The method of claim 7, further comprising:
    receiving, from the MCG, an SCG activation indication from the base station based on a pending downlink data transmission on the SCG.

10. The method of claim 1, further comprising:
    switching the MCG to serve the second network slice served by the SCG upon an expiration of the first inactivity timer; and
    switching the SCG to serve the first network slice served by the MCG upon an expiration of the first inactivity timer.

11. The method of claim 1, wherein the registration request includes third S-NSSAI associated with a third network slice, and the registration accept message is associated with the third network slice.

12. The method of claim 11, further comprising:
    receiving an inter-master handover indication from the base station;
    performing the inter-master handover; and
    receiving a downlink data transmission on the third network slice, wherein a third priority associated with the third network slice is higher than the first priority or the second priority associated with the network slice served by the MCG which has lower priority than the first priority or the second priority associated with the network slice served by the SCG.

13. The method of claim 11, further comprising:
    receiving a secondary node change from the base station;
    performing the secondary node change; and
    receiving a downlink data transmission on the third network slice, wherein a third priority associated with the third network slice is higher than the first priority or the second priority associated with the network slice served by the SCG which has lower priority than the first priority or the second priority associated with the network slice served by the MCG, or wherein a third priority associated with the third network slice is lower than the first priority and the second priority and the SCG is suspended.

14. The method of claim 11, further comprising:
    determining a pending uplink data transmission on the third network slice;
    transmitting a priority indication associated with the third network slice to the base station;
    receiving an inter-master handover indication from the base station;
    performing the inter-master handover; and
    transmitting uplink data on the third network slice wherein a third priority associated with the third network slice is higher than the first priority or the second priority associated with the network slice served by the MCG which has lower priority than the first priority or the second priority associated with the network slice served by the SCG.

15. The method of claim 11, further comprising:
determining a pending uplink data transmission on the third network slice;
transmitting a priority indication associated with the third network slice to the base station;
receiving a secondary node change indication from the base station;
performing the secondary node change; and
transmitting uplink data on the third network slice wherein a third priority associated with the third network slice is higher than the first priority or the second priority associated with the network slice served by the SCG which has lower priority than the first priority or the second priority associated with the network slice served by the MCG, or wherein a third priority associated with the third network slice is lower than the first priority and the second priority and the SCG is suspended.

16. A method of wireless communication of a base station, comprising:
receiving, from a user equipment (UE), a registration request comprising first single network slice selection assistance information (S-NSSAI) associated with a first network slice and second S-NSSAI associated with a second network slice;
transmitting, to the UE, a registration accept message associated with the first network slice and the second network slice, the first network slice being associated with a first priority higher than a second priority associated with the second network slice, and the first network slice being served by a master cell group (MCG) and the second network slice being served by a secondary cell group (SCG); and
initiating a first inactivity timer for the MCG and a second inactivity timer for the SCG.

17. The method of claim 16, wherein the first priority and the second priority are received from the UE.

18. The method of claim 16, wherein the first priority and the second priority are determined based on a network policy.

19. The method of claim 16, further comprising:
establishing a first protocol data unit (PDU) session for the first network slice and a second PDU session for the second network slice.

20. The method of claim 16, further comprising:
resetting the first inactivity timer based on at least one of an uplink data transmission or a downlink data transmission on the MCG.

21. The method of claim 16, further comprising:
resetting the second inactivity timer based on at least one of an uplink data transmission or a downlink data transmission on the SCG.

22. The method of claim 16, further comprising:
suspending the SCG upon an expiration of the second inactivity timer.

23. The method of claim 22, further comprising:
receiving a request to activate the SCG based on a pending uplink data transmission on the SCG via receiving UE assistance information (UAI) or a medium access control (MAC) control element (MAC-CE) to the MCG.

24. The method of claim 22, further comprising:
transmitting, via the MCG, an SCG activation indication to the UE based on a pending downlink data transmission on the SCG.

25. The method of claim 16, further comprising:
switching the MCG to serve the second network slice served by the SCG upon an expiration of the first inactivity timer; and
switching the SCG to serve the first network slice served by the MCG upon an expiration of the first inactivity timer.

26. The method of claim 16, wherein the registration request includes third S-NSSAI associated with a third network slice, and the registration accept message is associated with the third network slice.

27. The method of claim 26, further comprising:
transmitting an inter-master handover indication to the UE;
performing the inter-master handover; and
transmitting a downlink data transmission on the third network slice, wherein a third priority associated with the third network slice is higher than the first priority or the second priority associated with the network slice served by the MCG which has lower priority than the first priority or the second priority associated with the network slice served by the SCG.

28. The method of claim 26, further comprising:
transmitting a secondary node change to the UE;
performing the secondary node change; and
transmitting a downlink data transmission on the third network slice, wherein a third priority associated with the third network slice is higher than the first priority or the second priority associated with the network slice served by the SCG which has lower priority than the first priority or the second priority associated with the network slice served by the MCG, or wherein a third priority associated with the third network slice is lower than the first priority and the second priority and the SCG is suspended.

29. The method of claim 26, further comprising:
determining a pending uplink data transmission on the third network slice;
receiving a priority indication associated with the third network slice from the UE;
transmitting an inter-master handover indication to the UE;
performing the inter-master handover; and
receiving uplink data on the third network slice wherein a third priority associated with the third network slice is higher than the first priority or the second priority associated with the network slice served by the MCG which has lower priority than the first priority or the second priority associated with the network slice served by the SCG.

30. The method of claim 26, further comprising:
determining a pending uplink data transmission on the third network slice;
receiving a priority indication associated with the third network slice from the UE;
transmitting a secondary node change indication to the UE;
performing the secondary node change; and
receiving uplink data on the third network slice wherein a third priority associated with the third network slice is higher than the first priority or the second priority associated with the network slice served by the SCG which has lower priority than the first priority or the second priority associated with the network slice served by the MCG, or wherein a third priority associated with the third network slice is lower than the first priority and the second priority and the SCG is suspended.

* * * * *